(12) United States Patent
Park

(10) Patent No.: US 6,717,709 B2
(45) Date of Patent: Apr. 6, 2004

(54) SEMICONDUCTOR OPTICAL MODULATOR

(75) Inventor: Christopher Anthony Park, Stowmarket (GB)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/197,935

(22) Filed: Jul. 17, 2002

(65) Prior Publication Data

US 2003/0103255 A1 Jun. 5, 2003

(30) Foreign Application Priority Data

Dec. 3, 2001 (EP) .............................. 01310094

(51) Int. Cl.$^7$ ................................. G02F 1/01
(52) U.S. Cl. .................. 359/240; 359/245; 359/248
(58) Field of Search ................. 359/240, 245, 359/248; 372/50, 96

(56) References Cited

U.S. PATENT DOCUMENTS 4,716,449 A    12/1987  Miller .................... 257/21

6,583,917 B2 *  6/2003  Melloni et al. ............ 359/245

FOREIGN PATENT DOCUMENTS

| EP | 0 753 782 A1 | 1/1997 |
|----|--------------|--------|
| JP | 09146055 | 6/1997 |
| JP | 11038371 | 2/1999 |
| WO | WO 86/05598 | 9/1986 |

OTHER PUBLICATIONS

Kiernan, L., Examiner. European Search Report, Application No. EP 01 31 0094, dated Apr. 26, 2002.

* cited by examiner

*Primary Examiner*—Hung Xuan Dang
*Assistant Examiner*—Tuyen Tra

(57) ABSTRACT

An electro absorption modulator in which the photocurrent generated by the absorption of light is monitored and the bias voltage applied to the electro absorption modulator is varied in order to vary the photocurrent and thence the extinction ratio of the electro absorption modulator.

10 Claims, 3 Drawing Sheets

SEMICONDUCTOR OPTICAL MODULATOR

FIELD OF THE INVENTION

This invention relates to the field of semiconductor optical modulators and in particular to electro absorption modulators that are commonly used to provide external modulation to optical signals.

DISCUSSION OF THE BACKGROUND ART

Optical transmission systems have seen dramatic increases in data transmission rates, with 10 Gb/s systems in use in many SDH networks, with 40 Gb/s systems under development. One technique that has been used to obtain such data transmission rates is external modulation of optical sources. Conventionally, optical sources such as laser diodes have been directly modulated by supplying the modulating signal to an electrode connected to the active region of the laser such that the output of the laser varies with the modulating signal. The main drawback with this technique is that the data transmission rates are limited by the photonic transitions that govern the population inversion and radiative decay. In comparison, external modulation relies upon an optical device that can be switched between an attenuating state and a substantially non-attenuating state such that data can be modulated onto the constant output of an optical source. One device that is commonly used to provide external modulation is an electro absorption modulator (EAM), the structure and operation of an example of an EAM is described in EP-B-0 143 000.

SUMMARY OF THE INVENTION

According to a first aspect of the invention there is provided an optical modulator comprising an input to receive an electrical input signal and an output to present an electrical output signal characterised in that the modulator additionally comprises control means to vary the electrical input signal in response to the electrical output signal. Preferably the optical modulator is an electro-absorption modulator. The electrical input signal may be a dc bias voltage. The electrical output signal may be an ac signal and preferably varies with the absorption within the electro-absorption modulator.

According to a second aspect of the invention there is provided an optical signal generator comprising an optical source and an optical modulator as described above. Preferably the optical source is a distributed feedback laser.

According to a third aspect of the invention there is provided a method of operating an optical modulator, the method comprising the steps of: (i) applying an electrical control signal to the modulator; (ii) applying an electrical modulation signal to modulate a received optical signal; (iii) receiving an electrical output signal from the modulator, the method being characterised by the step of (iv) varying the electrical control signal in response to the electrical output signal. Preferably the optical modulator is an electro-absorption modulator. The electrical control signal may be a dc bias voltage. The electrical output signal may be an ac current and preferably the electrical output signal varies with the absorption incurring within the modulator.

Preferably the electrical control signal is varied to increase the magnitude of the electrical output signal. The electrical control signal may be varied to maintain the magnitude of the electrical output signal at or above a predetermined threshold.

BRIEF DESCRIPTION OF THE DRAWING

The invention will now be described, by way of example only, with reference to the following Figure in which.

DETAILED DESCRIPTION OF THE PREFERRED EMBODIMENT

Figure 1:
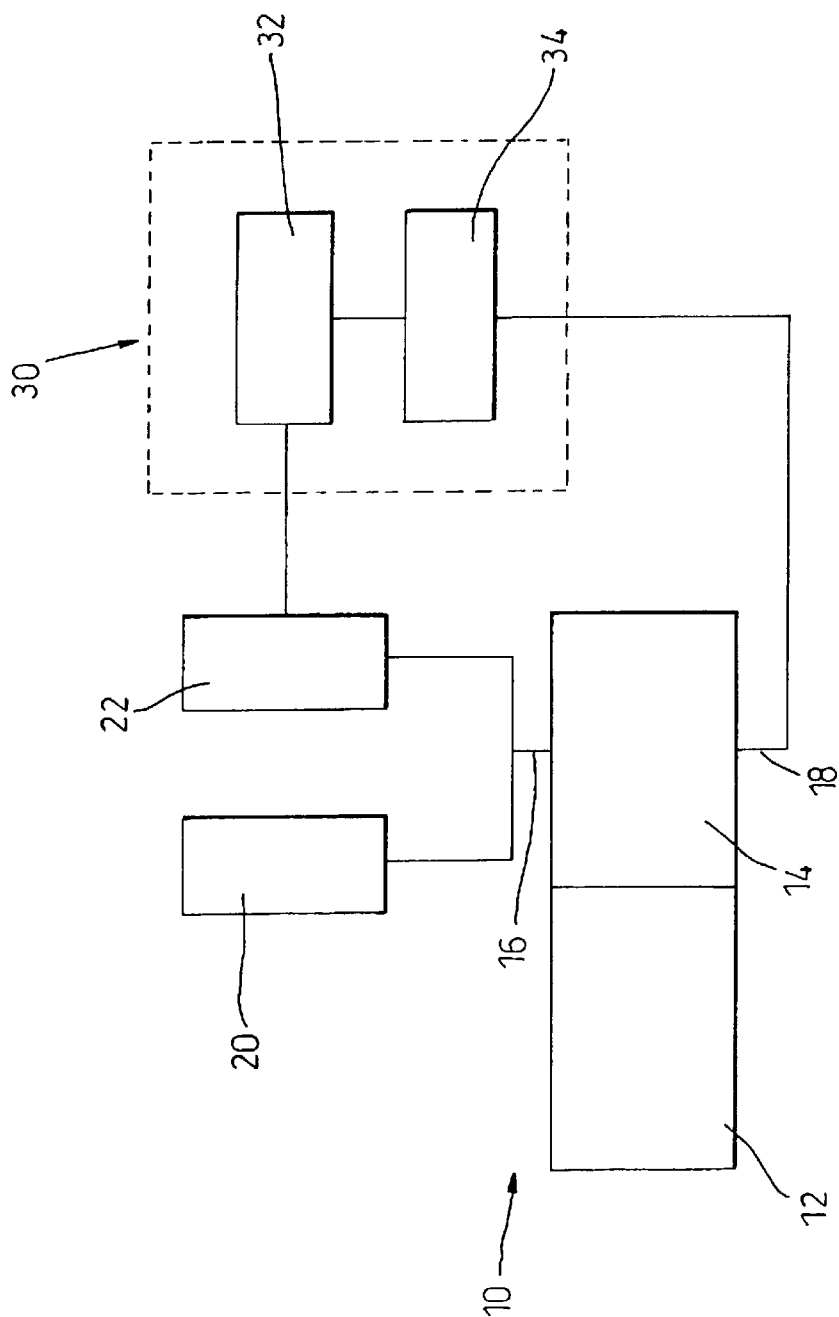
FIG. 1 shows a schematic depiction of a semiconductor optical modulator apparatus according to the present invention.

FIG. 1 shows a schematic depiction of a semiconductor optical modulator apparatus 10 that comprises optical source 12, electro absorption modulator (EAM) 14, control unit 30, modulator unit 20 and bias unit 22. EAM 14 comprises first and second terminals 16, 18 and control unit 30 comprises detector unit 34 and feedback unit 32. The optical source 12 provides an optical signal having a substantially constant optical power output that is received within the EAM 14. Typically the optical source is a laser and distributed feedback (DFB) lasers have been found to be particularly suitable in this application.

The EAM typically comprises a reverse biased pin junction that has an absorption bandedge. The wavelength at which this absorption bandedge is effective can be controlled by a modulating current such that, under the correct conditions, a '0' (or low) modulating signal causes the optical signal from the optical source to be partially absorbed by the EAM and a '1' (or high) modulating signal causes the EAM to allow the signal to pass through substantially unabsorbed. The modulated optical signal can then be launched into an optical fibre for onward transmission.

In the modulator apparatus 10 a modulating ac signal is fed from modulator unit 20 to first EAM terminal 16. Furthermore a dc biasing voltage is fed from bias unit 22 to first EAM terminal 16 to control the operation of the EAM. One EAM variable that is dependent upon the bias voltage is the extinction ratio, which is the ratio between a partially absorbed signal (when the EAM is in a blocking state) and a substantially unabsorbed signal (when the EAM is in a non-blocking state). Extinction ratios are usually within the range of 3 to 20 dB with a typical value being 10 dB.

When an EAM is modulated using an ac signal, a small ac photocurrent is generated in the electro-absorption region in proportion to the amount of light absorbed within the EAM. The insight of the present inventor is that this photocurrent can be varied to improve the performance of the EAM.

The photocurrent leaves the EAM at second EAM terminal 18 and is fed to detector unit 34 within control unit 30. Detector unit 34 measures the magnitude of the ac photocurrent and passes the data to feedback unit 32. The inventor determined that the maximum extinction ratio occurs when the photocurrent is at its highest and thus the feedback unit 32 sends control signals to the bias unit 22 to adjust the bias voltage in order to increase the ac photocurrent. The bias voltage can be controlled so as to maximise the ac photocurrent (and hence to have a substantially maximal extinction ratio), or alternatively the bias voltage can be controlled to ensure that the extinction ratio remains above an upper threshold.

Figure 2:
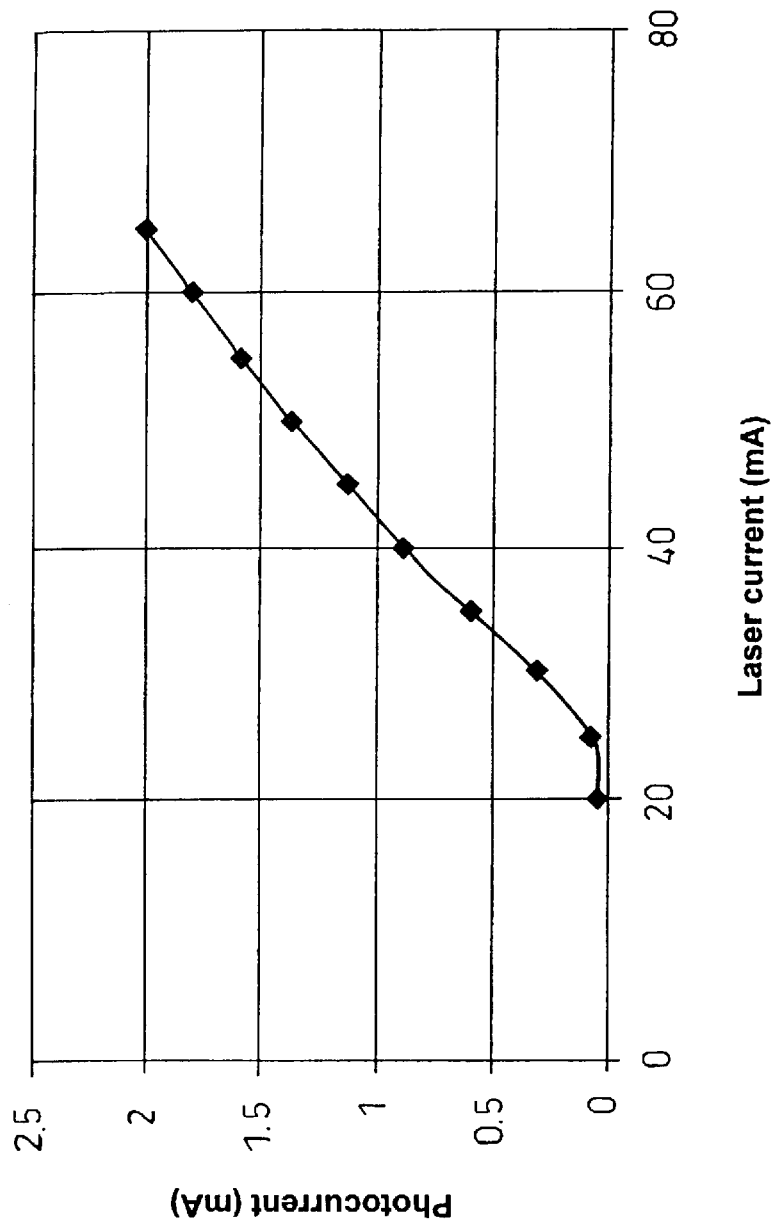
FIG. 2 is a graphical depiction of the relationship between EAM photocurrent and laser injection current.
Figure 3:
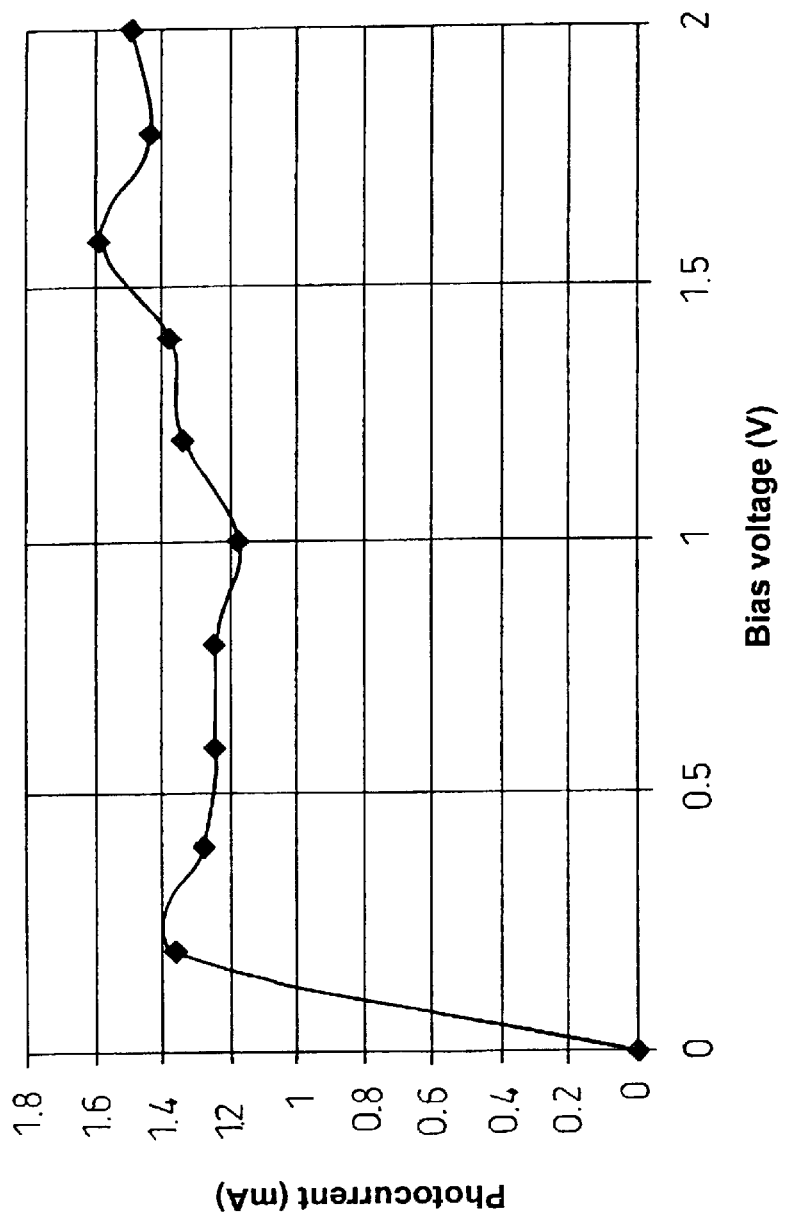
FIG. 3 is a graphical depiction of the relationship between EAM photocurrent and the EAM bias voltage.

FIG. 2 shows the variation of EAM photocurrent with laser injection current. Once the threshold level of the laser has been surpassed the photocurrent generated within the EAM increases proportionally with the laser current. FIG. 3 shows the variation in EAM photocurrent, for a constant input light level from a laser, with bias voltage. FIG. 3 shows that between approximately −0.2 V and −1 V (the EAM is negatively biased, hence the polarity of the voltages) there is a plateau, with the photocurrent generally increasing as the bias voltage increases from −1 V to −2 V, with a peak at around −1.5 V. The optimal bias voltage is one at (or near to) this peak in the bias voltage characteristic, such that the photocurrent will have its maximum value (or a value substantially identical to its maximum value). In the alternative, for the example shown in FIG. 3, the bias voltage could be controlled so as to maintain the photocurrent at or above 1.3 mA, for example. Clearly, the above examples relate to one particular device being operated under a certain set of parameters and different modulators, and different designs of modulators, will have different characteristics to those shown in FIGS. 2 & 3.

It will be readily understood that the arrangement described above with reference to FIG. 1 could be an integrated opto-electronic device, i.e. the laser and the EAM could be fabricated together, or two discrete components could be co-located. In the alternative, the laser and the EAM could have different locations within a piece of equipment with the output from the laser being delivered to the EAM by an optical waveguiding structure, such as an optical fibre. The present invention is suitable for use with any type of EAM, regardless of the materials used to construct the EAM or the wavelength(s) at which it operates.

What is claimed is:

1. An optical modulator comprising an input to receive both a modulating ac signal and a dc bias voltage and an output to present an ac output signal, wherein said modulator additionally comprises control means to vary the dc bias voltage in response to the ac output signal in order to control the modulator's extinction ratio.

2. An optical modulator according to claim 1, wherein the optical modulator comprises an electra-absorption modulator.

3. An optical modulator according to claim 2, wherein said ac output signal is an ac current that varies with the absorption within said electro-absorption modulator.

4. An optical signal generator comprising an optical source and an optical modulator, said optical modulator comprising an input to receive both a modulating ac signal and a dc bias voltage to present an ac output signal signal wherein said optical modulator additionally comprises control means to vary said dc bias voltage in response to said ac output signal in order to control said optical modulator's extinction ratio.

5. An optical signal generator according to claim 4, wherein said optical source is a distributed feedback laser.

6. A method of operating an optical modulator, said method comprising the steps of:
   (i) applying a dc bias voltage to said optical modulator;
   (ii) applying an ac modulation signal to modulate a received optical signal;
   (iii) receiving an ac output signal from said optical modulator; and
   (iv) varying said dc bias voltage in response to said ac output signal in order to control said optical modulator's extinction ratio.

7. A method according to claim 6, wherein said optical modulator is an electra-absorption modulator.

8. A method according to claim 6, wherein said ac output signal varies with the absorption incurring within said optical modulator.

9. A method according to claim 6, wherein said dc bias voltage is varied to increase the magnitude of said ac output signal.

10. A method according to claim 6, wherein said dc bias voltage is varied to maintain the magnitude of said ac output signal above a predetermined threshold.

* * * * *